(12) United States Patent
Javvaji et al.

(10) Patent No.: US 8,225,356 B2
(45) Date of Patent: Jul. 17, 2012

(54) MEDIA CHANNEL SELECTION

(75) Inventors: Shashikiran Javvaji, Littleton, CO (US); William J. Ivanich, Parker, CO (US)

(73) Assignee: EchoStar Technologies L.L.C., Englewood, CO (US)

(*) Notice: Subject to any disclaimer, the term of this patent is extended or adjusted under 35 U.S.C. 154(b) by 380 days.

(21) Appl. No.: 12/244,342

(22) Filed: Oct. 2, 2008

(65) Prior Publication Data
US 2010/0088728 A1   Apr. 8, 2010

(51) Int. Cl.
*H04N 5/445* (2011.01)
*H04N 5/50* (2006.01)

(52) U.S. Cl. ............... 725/57; 725/37; 725/38; 348/734

(58) Field of Classification Search .............. 725/37–38, 725/57; 348/731, 734
See application file for complete search history.

(56) References Cited

U.S. PATENT DOCUMENTS

| | | | | |
|---|---|---|---|---|
| 5,152,011 A * | 9/1992 | Schwob | ......................... | 348/731 |
| 5,191,423 A * | 3/1993 | Yoshida | ........................... | 725/57 |
| 5,315,392 A * | 5/1994 | Ishikawa et al. | ................ | 725/56 |
| 5,317,403 A * | 5/1994 | Keenan | ........................... | 725/38 |
| 5,894,276 A * | 4/1999 | Altidor et al. | ................. | 455/566 |
| 6,047,196 A * | 4/2000 | Makela et al. | ................. | 455/566 |
| 6,166,778 A * | 12/2000 | Yamamoto et al. | ........... | 348/569 |
| 6,636,273 B1 * | 10/2003 | Weber | ........................... | 348/734 |
| 6,708,336 B1 | 3/2004 | Bruette | | |
| 6,766,526 B1 * | 7/2004 | Ellis | ................................ | 725/57 |
| 7,568,212 B2 * | 7/2009 | Tsubouchi | ...................... | 725/38 |
| 7,624,413 B2 * | 11/2009 | Tsubouchi | ...................... | 725/57 |
| 7,733,427 B2 * | 6/2010 | Kunita | ........................... | 348/731 |
| 2002/0060750 A1 * | 5/2002 | Istvan et al. | ................... | 348/569 |
| 2002/0122079 A1 * | 9/2002 | Kamen et al. | ................. | 345/863 |
| 2002/0181712 A1 | 12/2002 | Tsubouchi | | |
| 2003/0012360 A1 * | 1/2003 | Kim | .......................... | 379/355.01 |
| 2005/0062619 A1 * | 3/2005 | Jellicoe | ........................... | 341/22 |
| 2005/0231486 A1 * | 10/2005 | Wiggeshoff | ................... | 345/168 |
| 2005/0278741 A1 * | 12/2005 | Robarts et al. | ................... | 725/46 |
| 2006/0017224 A1 * | 1/2006 | Seidman et al. | ........... | 273/138.1 |
| 2007/0250897 A1 * | 10/2007 | Pearson | ....................... | 725/135 |
| 2009/0193459 A1 | 7/2009 | Hsiao | | |

FOREIGN PATENT DOCUMENTS

| | | |
|---|---|---|
| DE | 10040745 A1 | 3/2002 |
| EP | 0401015 A2 | 12/1990 |
| WO | 2009002101 A1 | 12/2008 |

* cited by examiner

*Primary Examiner* — An Son P Huynh
(74) *Attorney, Agent, or Firm* — Lowe Graham Jones PLLC

(57) ABSTRACT

A media control system processes a numeric user input to identify a set of alphabetic letters. The media control system selects a plurality of media channel names based on the set of alphabetic letters. The media control system generates a first signal to drive a first display of the media channel names. The media control system processes additional user input to select one of the displayed media channel names. The media control system generates a second signal to drive a second display associated with a media channel identified by the selected one of the displayed media channel names.

23 Claims, 8 Drawing Sheets

MEDIA CHANNEL SELECTION

BACKGROUND

Media distribution systems transfer video, audio, graphics and other media content to user media devices, such as televisions, audio players, and computers. The media distribution systems transfer the media content over various media channels. A few examples of media distribution systems are broadcast television networks and satellite radio stations. The media channels have names, but users typically request the media channels by channel number. There are now thousands of different media channels making it difficult for the user to remember the channel number for each media channel. The media channel numbers also vary from one media distribution system to the next. If the channel number of a desired media channel is unknown, the user may have to flip through hundreds of media channels by channel number to locate the desired media channel. Alternatively, the user may be able to scroll through several pages of a program guide to find the desired media channel.

SUMMARY OF THE DISCLOSURE

A media control system processes a numeric user input to identify a set of alphabetic letters. The media control system selects a plurality of media channel names based on the set of alphabetic letters. The media control system generates a first signal to drive a first display of the media channel names. The media control system processes additional user input to select one of the displayed media channel names. The media control system generates a second signal to drive a second display associated with a media channel identified by the selected one of the displayed media channel names.

Although not required, the first user input may comprise a single numeral that is associated with a set of alphabetic letters including the first letter of the media channel name. The second user input may comprise another numeral that is associated with another set of alphabetic letters including the second letter of the media channel name. If necessary, additional user inputs can relate to subsequent letters in the media channel name. The media control system identifies the desired media channel name based on these numeric user inputs and their associated letter sets. The use of numeric inputs for this purpose may be detected by the media control system based on an amount of time that the numeral is input by the user.

BRIEF DESCRIPTION OF THE DRAWINGS

Many aspects of the present disclosure may be better understood with reference to the following drawings. The components in the drawings are not necessarily depicted to scale, as emphasis is instead placed upon clear illustration of the principles of the disclosure. Moreover, in the drawings, like reference numerals designate corresponding parts throughout the several views. Also, while several embodiments are described in connection with these drawings, the disclosure is not limited to the embodiments disclosed herein. On the contrary, the intent is to cover all alternatives, modifications, and equivalents.

DETAILED DESCRIPTION

Figure 1:
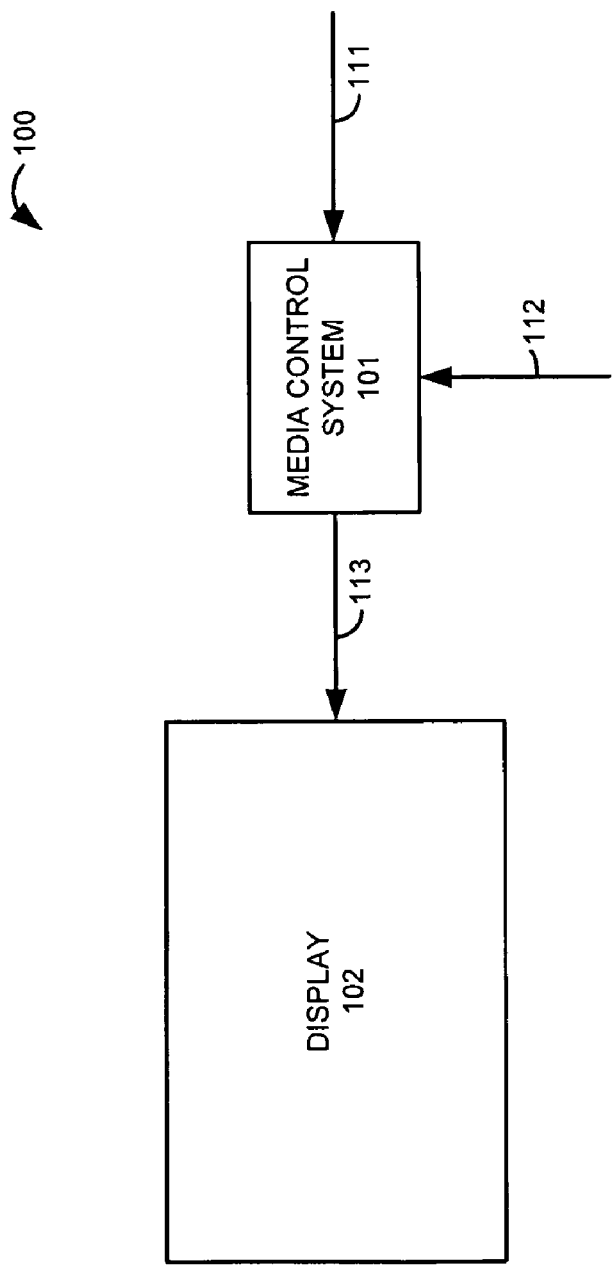
FIG. 1 illustrates a media control system and its operating environment.

FIG. 1 illustrates media control system 101 and its operating environment. Media control system 101 comprises circuitry, interfaces, and encoded instructions that direct its operations. Media control system 101 could be integrated within a set-top box, computer, portable media device, digital media recorder, media relay device, television control system, or some other type of media control apparatus. Media control system 101 may be a single device or may be distributed across multiple devices.

Media control system 101 receives media channels 111. Media channels 111 each have a name, such as NBC, CNN, Sounds of the 70's, or Geo TV, although there are many other examples. Media channels 111 carry a stream of video, audio, graphics, or some other form of media content. A media channel typically provides a continuous stream of media content, although the media channel may shut down for certain periods, such as late at night. Media control system 101 may receive media channels 111 in combination or individually upon request. Media control system 101 may receive media channels 111 over an optical network, satellite network, coaxial cable network, telephony network, Internet, or some other form of communication network—including combinations thereof.

Media control system 101 receives user inputs 112 that include numeric inputs. Media control system 101 identifies media channel names based on the numeric user inputs. Although not required, user inputs 112 may also include menu scrolling instructions, menu selection instructions, or some other type of user instructions. Media control system 101 may receive user inputs 112 directly from a user or through a remote control device operated by the user. The remote control device could be a handheld remote control, computer, portable media device, or some other type of user interface.

Media control system 101 transfers display signals 113 to display 102. Display 102 comprises a television, computer monitor, graphical screen, or some other display apparatus that graphically presents the information in display signals 113. The displayed information comprises menu screens, programming guides, media content, or some other graphically presented information. The media content includes video, audio, graphics, text, or some other form media— including combinations thereof. Media control system 101 and display 102 may be discreet systems or they may be integrated together.

Figure 2:
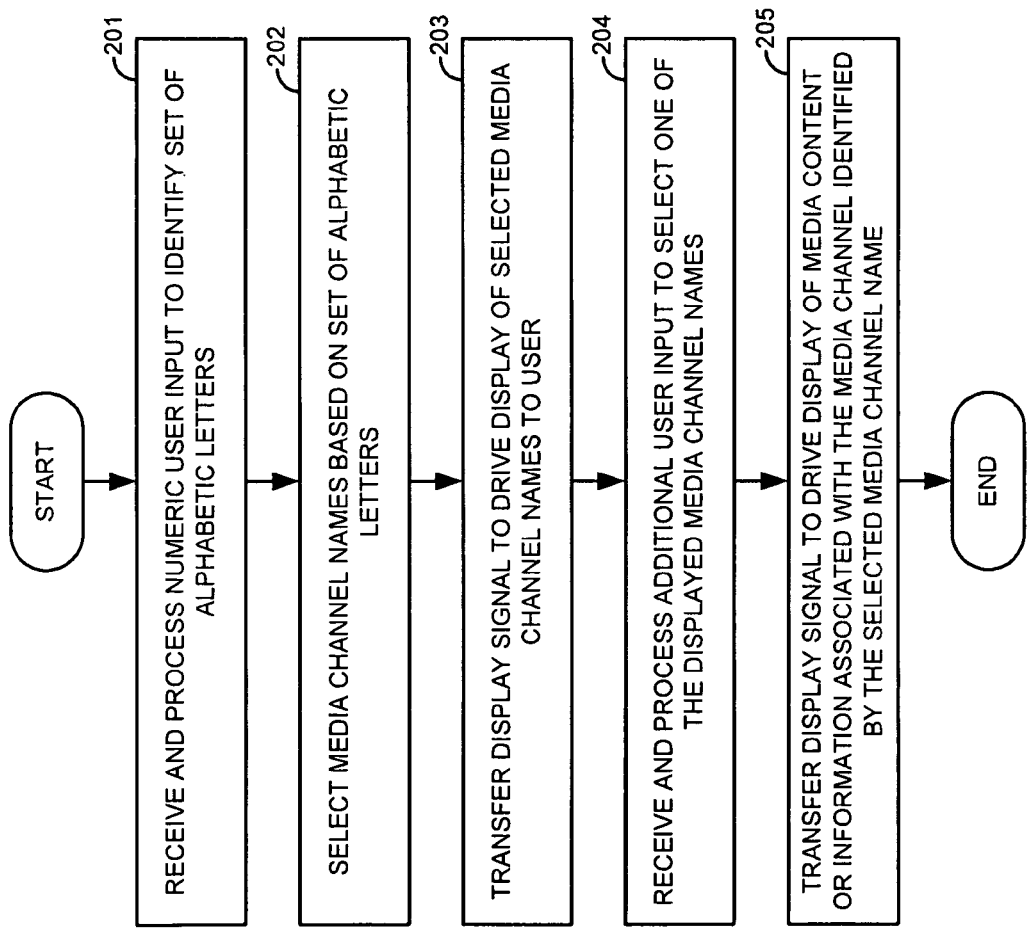
FIG. 2 illustrates the operation of a media control system.

FIG. 2 illustrates the operation of media control system 101. Media control system 101 receives and processes a numeric user input to identify a set of alphabetic letters (201). Various techniques could be used to associate numeric inputs with sets of alphabetic letters. For example, single numerals may be individually associated with different sets of 3-4 letters that together include all 26 letters in the English alphabet. The single numerals could range from 0-9 or could use a smaller range, such as 2-9. In another example, the numbers 1-26 may be respectively associated with the 26 letters in the English alphabet. Other association techniques, numerical systems, and alphabets could be used.

Although not required, media control system 101 could detect that a numeric user input indicates its associated set of alphabetic letters based on an amount of time that the user input is provided. Consider that the numeral 3 is associated with the letters D, E, and F. If the user inputs the numeral 3 for less than a pre-determined time period, then the user input is simply the numeral 3. However, if the user inputs the numeral 3 for more than the pre-determined time period, such as by pressing and holding the 3 key for one second, then media control system 101 discerns that the numeric user input indicates the associated letters D, E, and F. This pre-determined time period could be 0.5 seconds, 0.75 seconds, 1 second, or some other time increment.

Media control system 101 selects media channel names based on the set of alphabetic letters (202). Although some other technique could be used, the selection process typically entails selecting the media channel names that start with one of the set of letters associated with the numeric input. For example, if the numeral 2 is input by the user and is associated with the letters A, B, and C, then media control system 101 selects the media channel names that begin with the letters A, B, or C. If the numeral 2 were only associated with the letter B and were input by the user, then media control system 101 would select the media channel names that begin with the letter B. Note that media control system 101 maintains a master list of channel names to initially select the set from. The master list could be the names of all known channels, offered channels, purchased channels, favorite channels, or some other grouping of media channels Media control system 101 generates and transfers a display signal to display 102, and in response, display 102 displays the selected media channel names to the user (203). The user provides additional user input in response to the displayed media channel names. The additional user input might be a single instruction from the user or an interactive session comprising multiple instructions from the user. Media control system 101 processes the additional user input to select one of the displayed media channel names (204). For example, the additional user input could be menu scroll and selection instructions that individually identify one of the displayed media channel names.

In another example, the additional user input could be another numeric input that is associated with a second set of letters. Media control system 101 would then reduce the displayed media channel names based on the new set of letters. Typically, the reduction eliminates the displayed media channel names whose second letter is not in the second set of letters. This process could repeat for the third letter in the media channel name and so on until only one media channel name remains, or until the user directly selects one of the remaining media channel names.

Consider a situation where a first user input of the numeral 2 indicates the letters A, B, and C, and a second user input of the numeral 3 indicates the letters D, E, F. In response to the first user input, media control system 101 would drive a first display of the media channel names with a first letter of A, B, or C. In response to the second user input, media control system 101 would drive a second display of the media channel names with a first letter of A, B, or C, and a second letter of D, E, or F. As stated above, this process could be repeated until only one name remains or until the user directly selects one of the remaining names.

Media control system 101 generates and transfers a display signal to display 102, and in response, display 102 displays media content or other information associated with the media channel identified by the selected media channel name (205). In some examples, the display comprises video programming currently playing on the media channel. Thus, the above operation effectively changes the media channel for the user based on the channel name. In some examples, the display comprises a video program guide for the media channel. The program guide indicates future programming on the media channel. In some examples, the display indicates that the media channel name is a search input to a search interface. Search interfaces are typically used to find a specific media program to be provided in the future. In other examples, the display indicates that the media channel is added to a favorite channels list. The favorite channels list comprises a restricted list of media channels to allow the user more convenient access to their favorite channels. Alternatively, the display could present other information associated with the media channel identified by the selected media channel name.

Figure 3:
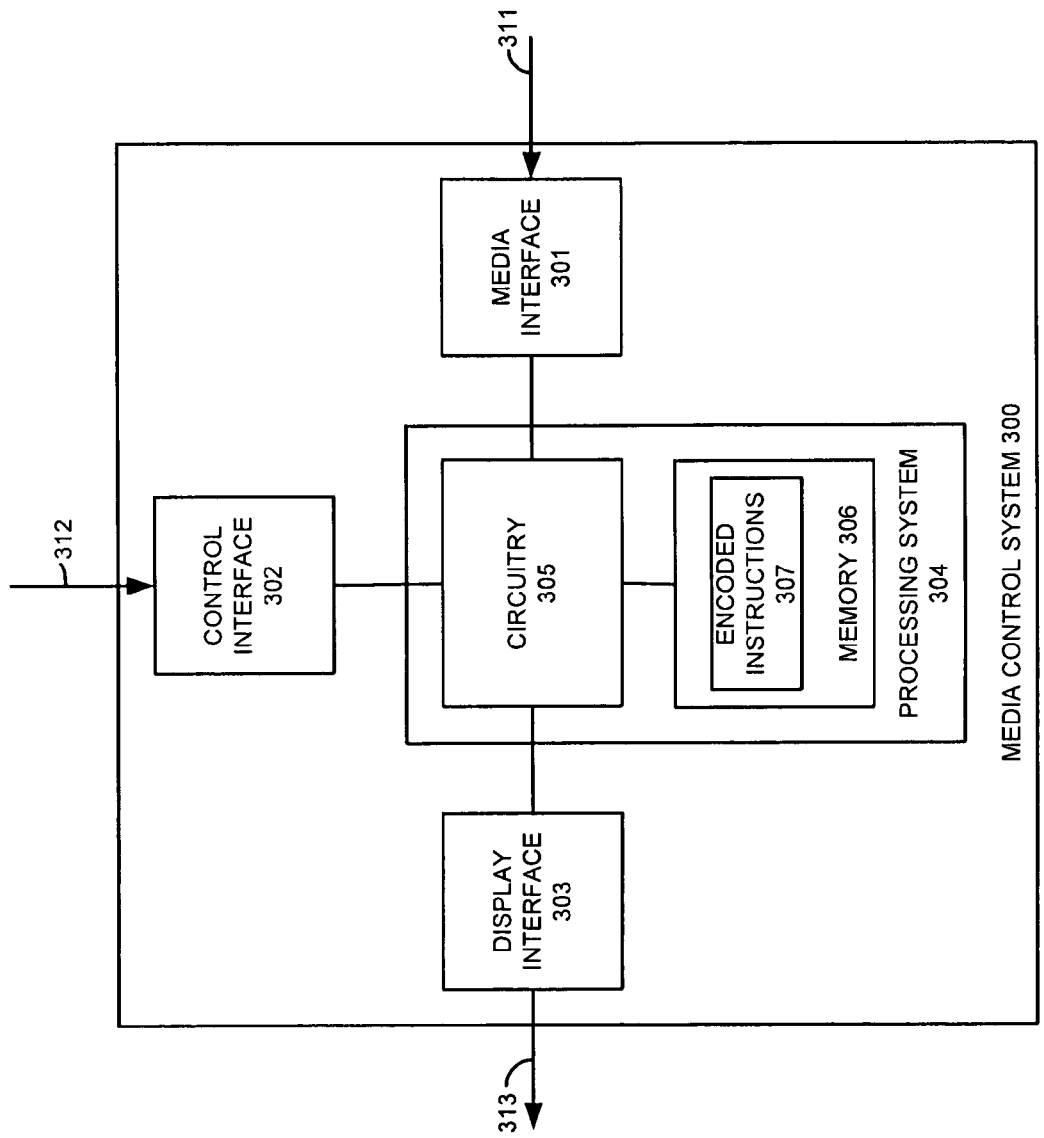
FIG. 3 illustrates the configuration of a media control system.

FIG. 3 illustrates the configuration of media control system 300. Media control system 300 provides an example of media control system 101, although media control system 101 could use other configurations. Media control system 300 comprises media interface 301, control interface 302, display interface 303, and processing system 304. Processing system 304 includes circuitry 305 and memory 306. Memory 306 stores encoded instructions 307.

Media interface 301 comprises circuitry and communications components that receive media channels 311. Media interface 301 may include a receiver, down-converter, tuner, descrambler, decoder, memory, microprocessor, microcontroller, digital signal processor, logic circuitry, or some other type of media processing electronics. Control interface 302 comprises circuitry and communications components that receive user inputs 312. Control interface 302 may include an infrared or RF receiver, keypad, touch screen, memory, microprocessor, microcontroller, logic circuitry, or some other type of user interface components. Display interface 303 comprises circuitry and communications components that transfer display signals 313. Display interface 301 may include a media port, high-definition multimedia interface, audio/video component interface, encoder, memory, microprocessor, microcontroller, digital signal processor, logic circuitry, or some other type of media transfer electronics.

Circuitry 305 comprises a microprocessor, media processor, memory, microcontroller, digital signal processor, logic circuitry, bus structures, or some other type of processing apparatus. Memory 306 comprises a disk, flash drive, integrated circuit, or some other type of computer-readable medium. Encoded instructions 307 comprise software, firmware, or some other type of machine-readable processing instructions. Circuitry 305 reads encoded instructions 307 from memory 306 and executes encoded instructions 307 to operate media control system 300 as described herein for the various media control systems. Although memory 306 is illustrated within media control system 300, memory 306 may also be external to system 300. For example, memory 306 could include an external portion, such as disk or flash drive, that stores encoded instructions 307 for subsequent transfer to the internal portion of memory 306 within system 300.

Figure 4:
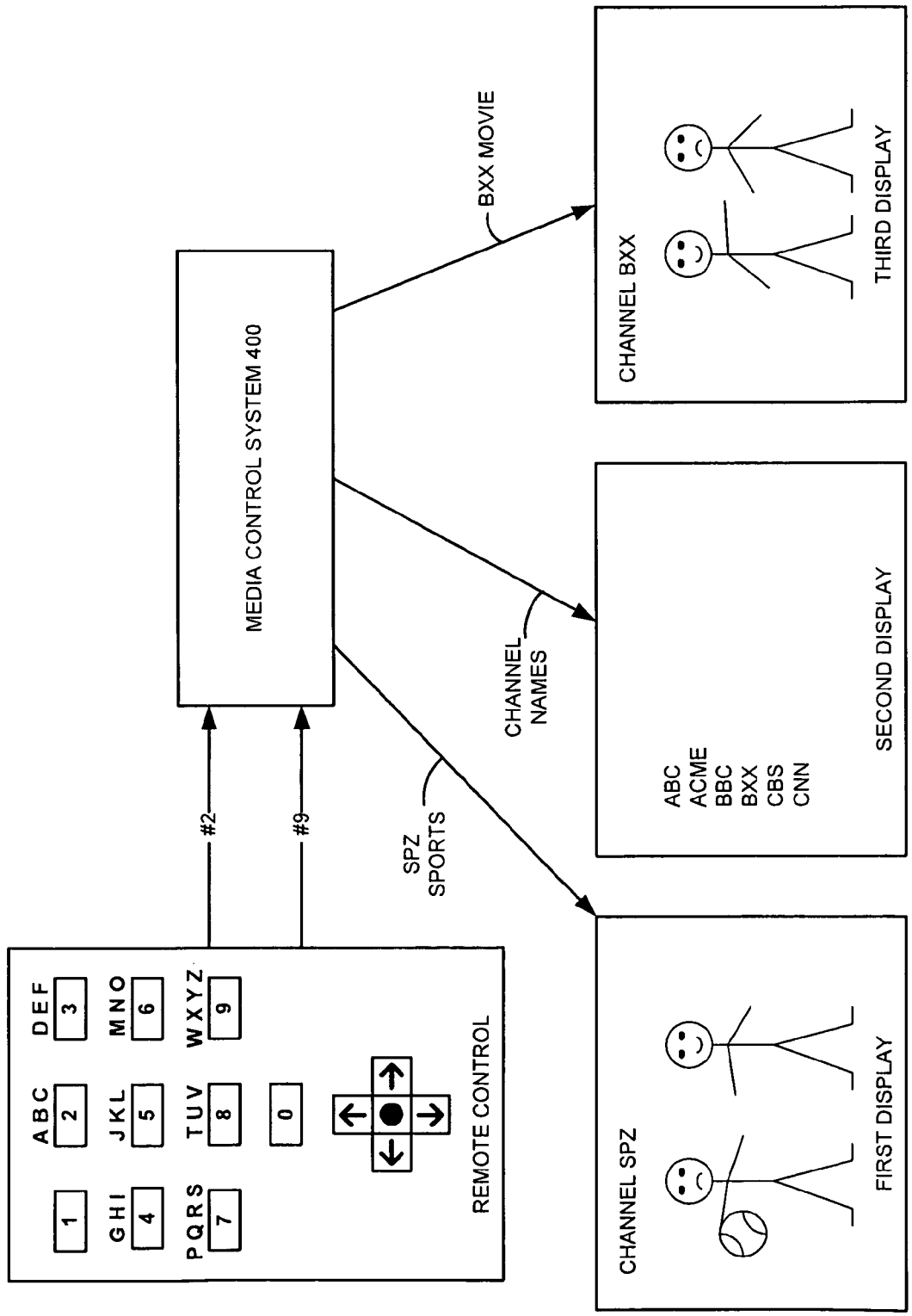
FIG. 4 illustrates the operation of a media control system.

FIG. 4 illustrates the operation of media control system 400, although media control system operation may vary in other examples. Note the relationship between the letters A-Z and numbers 2-9 on the remote control. Consider that a user is currently watching media channel SPZ (the first display), but the user wants to change the media channel to media channel BXX. Although the user remembers the name of channel BXX, the user cannot remember the specific number for channel BXX. Fortunately for the user, media control system 400 can conveniently change media channels based on channel names that are easily specified by the user with simple numeric inputs.

In this example, the user presses the #2 key on their remote control for one second since the #2 is associated with B—the first letter in BXX. Due to the length of time of the user input, media control system 400 interprets the numeric user input as the selection of a channel name beginning with one of the letters A, B, or C. In response, media control system 400 selects the channel names that begin with the letters A, B, or C from the master channel list. Media control system 400 presents the selected channel names on a second display. The user then presses the #9 key on their remote control since the #9 is associated with X—the second letter in BXX. Media control system 400 interprets the input as indicating that the second letter of the channel name is one of the letters W, X, Y, or Z. Media control system 400 then eliminates all of the previously selected channel names that do not have W, X, Y, or Z as the second letter—leaving only the channel name BXX. Since BXX is the only channel name left, media control system 400 automatically transfers a movie currently playing on channel BXX as the third display (note that the first, second, and third displays are presented on the same display device but are shown separately for illustrative purposes).

Note that it may be possible for the user to provide the numeric inputs #2 and #9 is a successive manner, so that the display signal listing the selected channel names is initially transferred (perhaps only internally), but the selected channel names are not actually displayed, or are only displayed for a very short time interval. Thus, the user may not actually see the second display on FIG. 4. This situation could occur if media control system 400 receives the second input #9 in rapid succession to the first input #2, so that media control system 400 may select and display the movie on media channel BXX before the selected channel names could be effectively displayed. Thus, media control system 400 conveniently allows the user to change channels by numerically specifying the channel name instead of the channel number.

Figure 5:
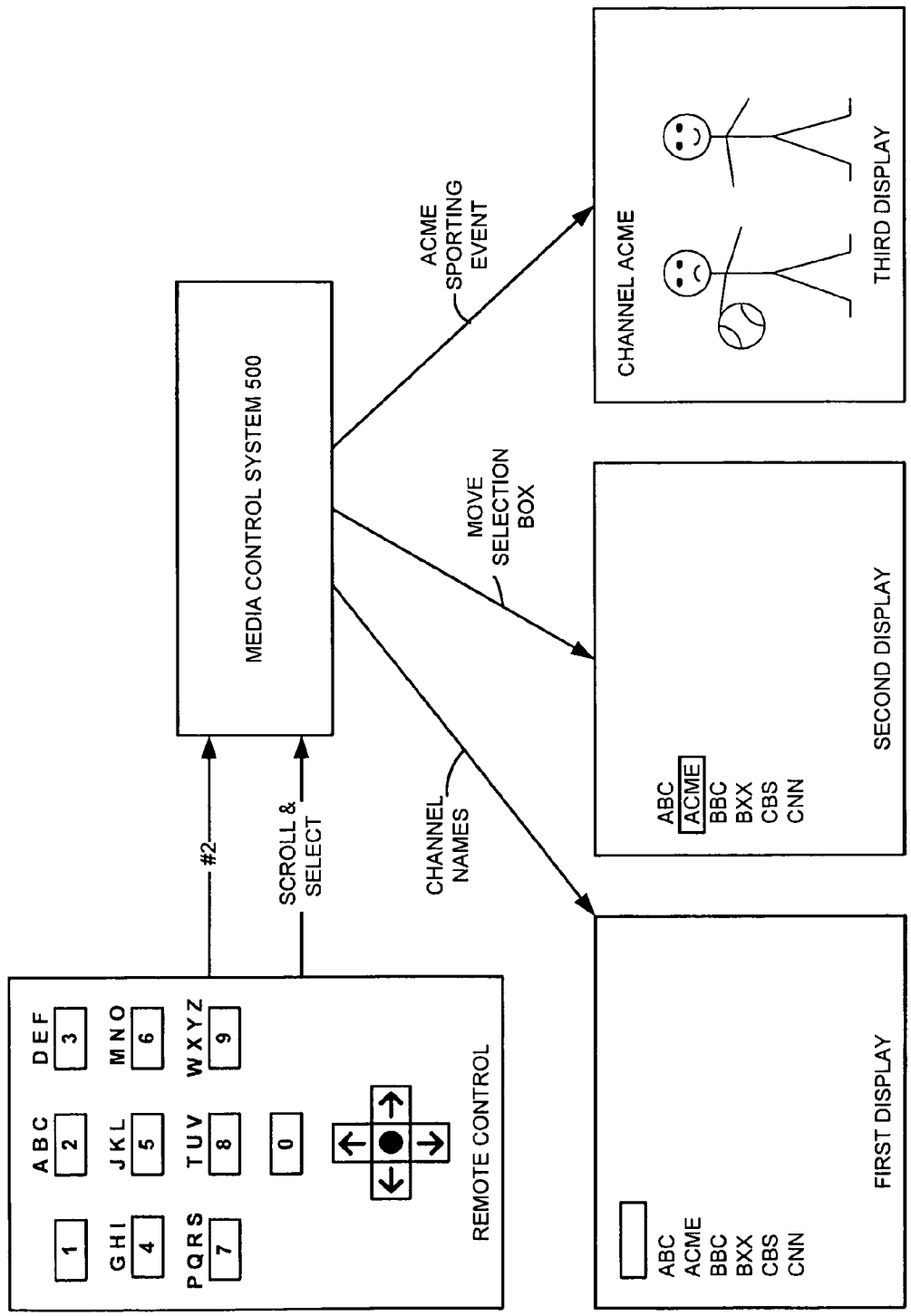
FIG. 5 illustrates the operation of a media control system.

FIG. 5 illustrates the operation of media control system 500, although media control system operation may vary in other examples. The user desires to view a sporting event on a video channel named ACME, but they do not know the channel number. The user presses the #2 key on their remote control for one second since the #2 is associated with A—the first letter in ACME. Due to the length of time of the user input, media control system 500 interprets the input as the selection of a channel name beginning with one of the letters A, B, or C. In response, media control system 500 selects media channel names from the master channel list that begin with the letters A, B, or C. Media control system 500 presents the selected channel names on the first display along with a selection box. The user then presses the down arrow key on their remote control to move the selection box to ACME, and then presses the selection key to select the ACME channel name as shown on the second display. In response, media control system 500 transfers the sporting event currently playing on channel ACME as the third display (note that the first, second, and third displays are presented on the same display device but are shown separately below for illustrative purposes).

Figure 6:
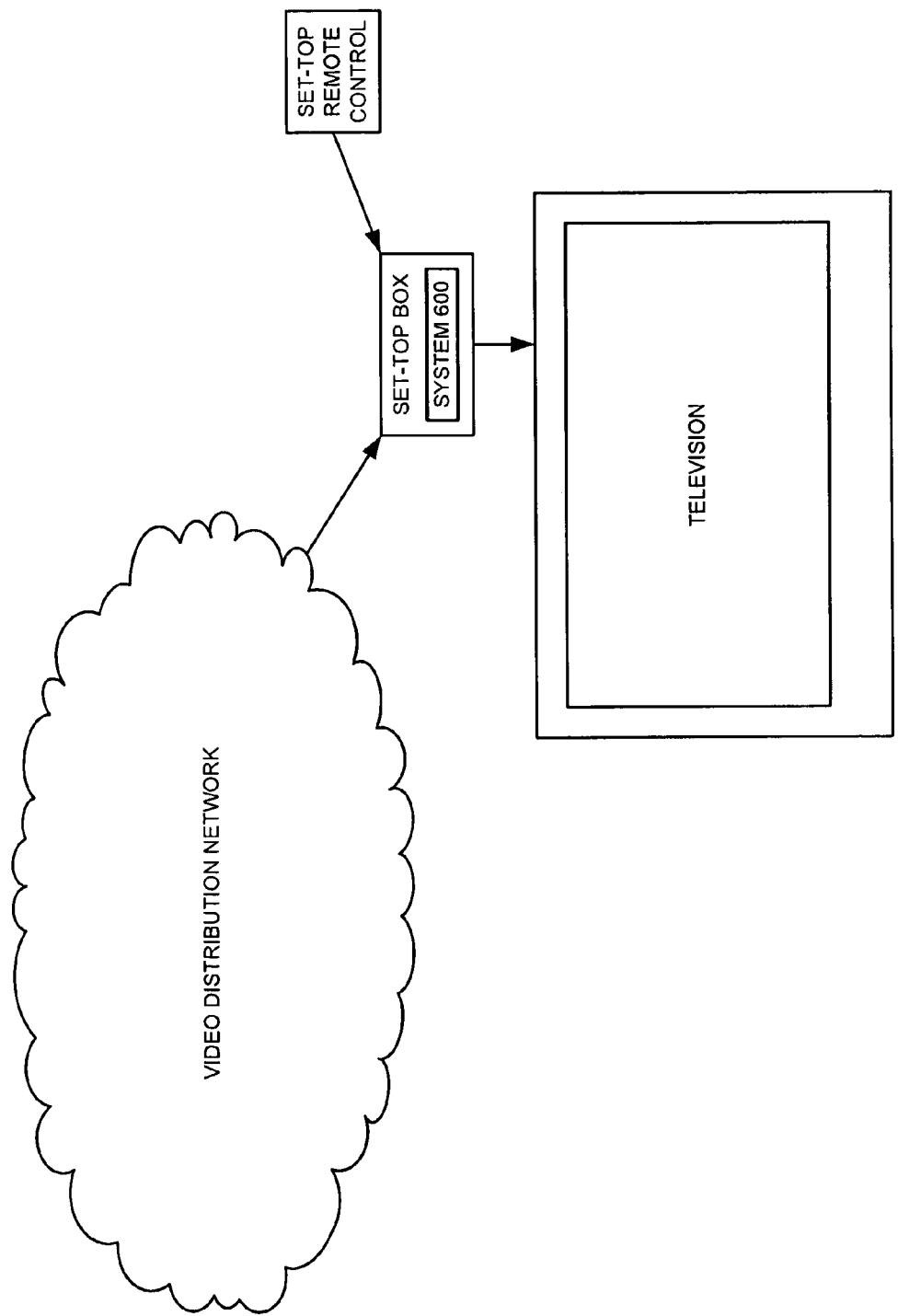
FIG. 6 illustrates an operational example for a media control system.

FIG. 6 illustrates an operational example for media control system 600, although there are other examples. In this example, media control system 600 is integrated within a television set-top box. The television set-top box receives video channels from a video distribution network, such as a satellite video system, cable television system, fiber optic video system, or telephony video system—including combinations thereof. The television set-top box receives user inputs from the set-top remote control operated by the user. The set-top box transfers display signals to the television, which responsively presents corresponding video, audio, graphics, or associated information from the display signals. Media control system 600 processes numeric user inputs to select media channel names and presents the selected media channel names on the television. Media control system 600 processes additional user input to select one of the displayed media channel names and presents media content on the television for the identified media channel.

Figure 7:
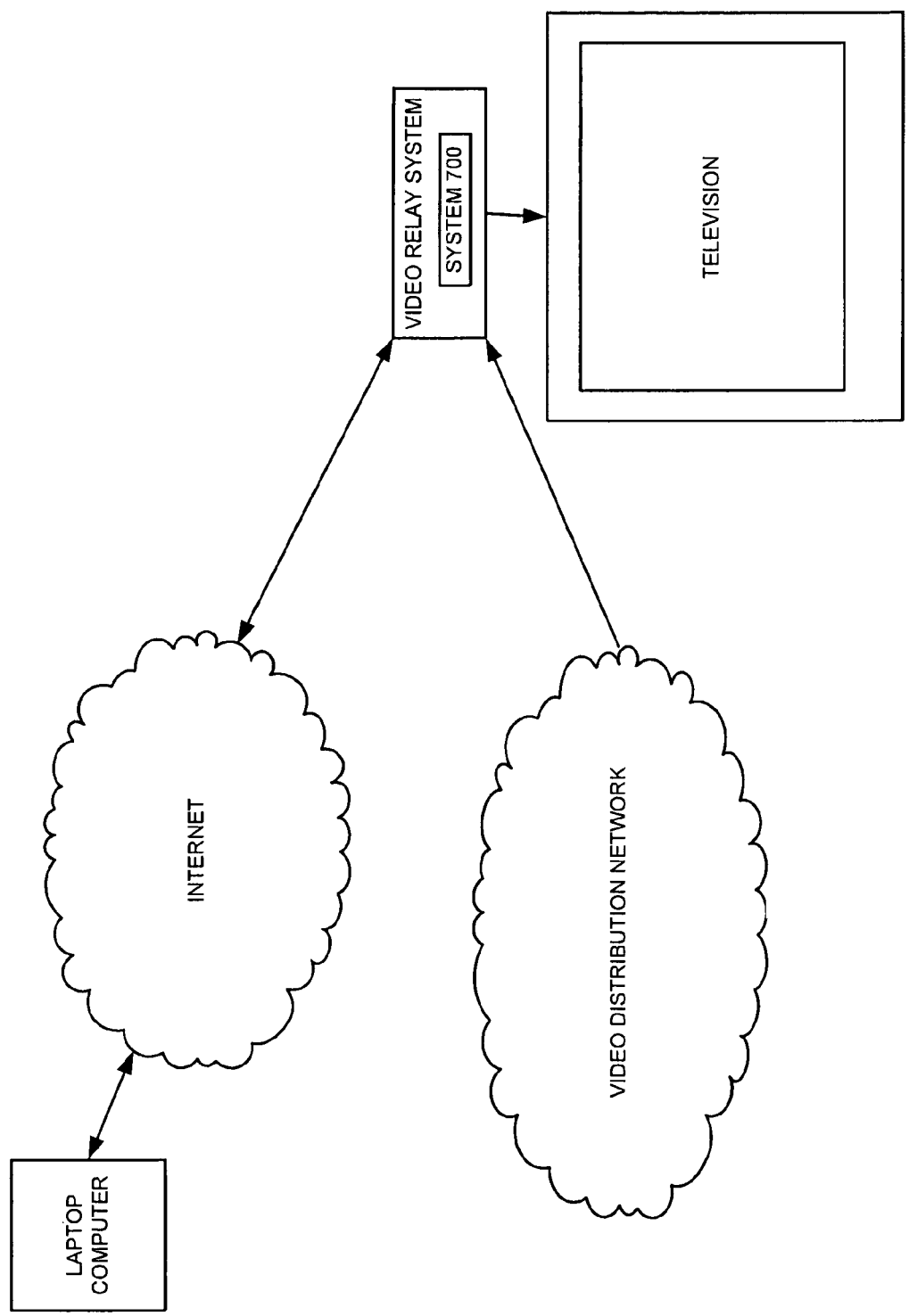
FIG. 7 illustrates an operational example for a media control system.

FIG. 7 illustrates an operational example for media control system 700, although there are other examples. In this example, media control system 700 is integrated within a video relay system. Note that the video relay system may also include a set-top box that drives the television and interacts with a proximate user as described above, but these operations are omitted from this example for clarity. The video relay system receives video channels from a video distribution network, such as a satellite video system, cable television system, telephony video system, or optical video system—including combinations thereof. The laptop computer presents an image of a user remote control to solicit user inputs and transfers the user inputs to the video relay system over the Internet. The video relay system transfers display signals over the Internet to the laptop computer, which responsively presents corresponding video, audio, graphics, or associated information. Media control system 700 processes numeric user inputs to select media channel names and presents the selected media channel names on the laptop computer. Media control system 700 processes additional user input to select one of the displayed media channel names and presents media content on the laptop computer for the identified media channel.

Figure 8:
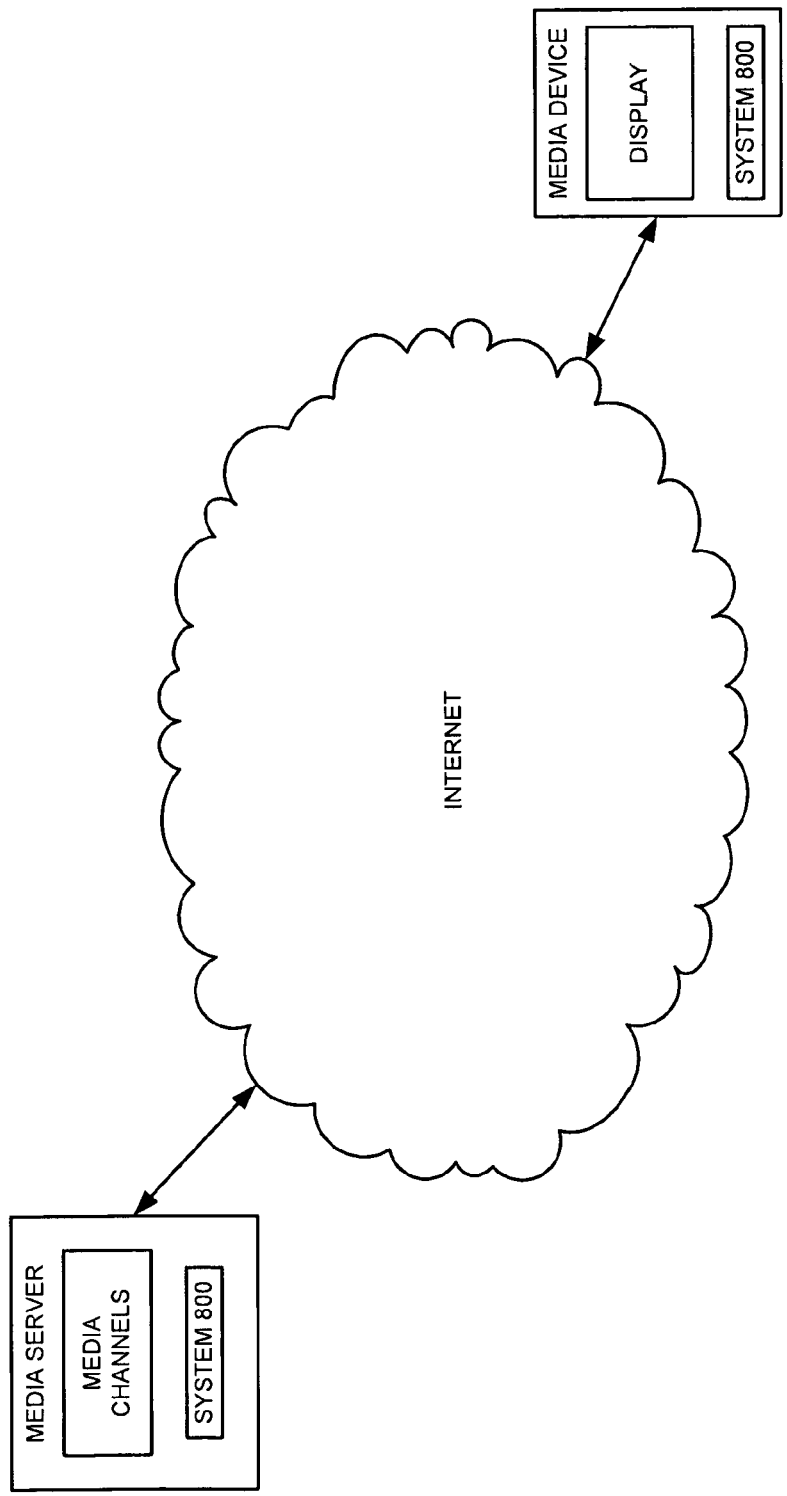
FIG. 8 illustrates operational examples for a media control system.

FIG. 8 illustrates three operational examples for media control system 800, although there are other examples. In a first example, media control system 800 is distributed across a media device and a media server. The media device requests a media channel from the media server over the Internet. The media server streams media content for the requested media channel to the media device over the Internet. The media device plays the received media content for the requested media channel. To identify the requested media channel, media control system 800 processes numeric user inputs to select media channel names and presents the selected media channel names on the media device display. Media control system 800 processes additional user input to identify one of the displayed media channel names and requests media content on that media channel.

In a second example, media control system 800 is located in the media device and not in the media server. To request a media channel, media control system 800 in the media device processes a numeric user input to select media channel names and presents the selected media channel names on its display. Media control system 800 in the media device then processes additional user input to identify one of the displayed media channel names and requests media content on that media channel from the media server. The media server streams media content for the requested media channel to the media device. The media device then plays the received media content for the requested media channel.

In a third example, media control system 800 is located in the media server and not in the media device. To request a media channel, the media device transfers a numeric user input to the media server. Media control system 800 in the media server processes the numeric user input to select media channel names and transfers the selected media channel names to the media device for display. Responsive to additional user input, the media device transfers the additional user input to the media server. Media control system 800 in the media server processes the additional user input to identify one of the displayed media channel names. The media server then streams media content for the identified media channel to the media device. The media device plays the received media content on the requested media channel.

The above description and associated drawings depict specific embodiments of the invention to teach those skilled in the art how to make and use the best mode of the invention. For the purpose of teaching inventive principles, some conventional aspects have been simplified or omitted. Those skilled in the art will appreciate variations of these embodiments that fall within the scope of the invention. Those skilled in the art will also appreciate that the features described above can be combined in various ways to form multiple embodiments of the invention. As a result, the invention is not limited to the specific embodiments described above, but only by the following claims and their equivalents.

What is claimed is:

1. A method of operating a media control system comprising:
    detecting a first numeric user input from a remote control, wherein the first numeric user input is defined by an amount of time that the first numeric user input is pressed;
    determining that the first numeric user input corresponds to a first numeral when the amount of pressed time of the first numeric user input is less than a predetermined amount of time;
    determining that the first numeric user input corresponds to a first set of alphabetic letters when the amount of pressed time of the first numeric user input is at least equal to the predetermined amount of time, and
    wherein in response to determining that the first numeric user input corresponds to the first set of alphabetic letters, the method further comprises:
        processing the first numeric user input to identify the first set of alphabetic letters;
        selecting a first plurality of media channel names based on the identified first set of alphabetic letters, wherein each of the first plurality of media channel names begins with a first alphabetic letter corresponding to one of the alphabetic letters of the identified first set of alphabetic letters; and
        generating a first signal configured to drive a display, wherein the display presents the first plurality of media channel names on the display;
    the method further comprising:
    detecting a second numeric user input from the remote control after detecting the first numeric user input,
        where in response to the determining the first numeric user input corresponding to the first set of alphabetic letters, determining that the second numeric user input corresponds to a second set of alphabetic letters and does not correspond to a second numeral associated with the second set of alphabetic letters;
        processing the second numeric user input to identify the second set of alphabetic letters associated with the second numeric user input;
        selecting a second plurality of media channel names from the first plurality of media channel names, wherein the selecting the second plurality of media channel names is based on a second alphabetic letter of each of the first plurality of media channel names, and wherein each of the second plurality of media channel names has the first alphabetic letter corresponding to one of the alphabetic letters of the identified first set of alphabetic letters followed by a second alphabetic letter corresponding to one of the alphabetic letters of the second set of alphabetic letters; and
        generating a second signal configured to drive a second display, wherein the second display presents the second plurality of media channel names.

2. The method of claim 1, wherein the second plurality of media channel names comprises a video channel.

3. The method of claim 1, wherein processing the second numeric user input to identify the second plurality of media channel names comprises processing a second additional numeric user input to identify an additional set of alphabetic letters and eliminating at least one of the first plurality of media channel names based on the additional set of alphabetic letters, wherein the eliminated media channel name has another alphabetic letter that is different from one of the alphabetic letters of the additional set of alphabetic letters.

4. The method of claim 1, wherein the second display comprises video programming on one of the second plurality of media channel names.

5. The method of claim 1, wherein the second display comprises a video program guide for the second plurality of media channel names.

6. The method of claim 1, wherein the second display indicates that the second plurality of media channel names is a search input to a search interface.

7. The method of claim 1, wherein the second display indicates that one of the second plurality of media channel names is added to a favorite channels list.

8. The method of claim 1, further comprising:
    receiving the first numeric user input from the remote control;
    receiving the second numeric user input from the remote control after receiving the first numeric user input; and
        determining that the second numeric user input corresponds to the second set of alphabetic letters and does not correspond to the second numeral associated with the second set of alphabetic letters in response to receiving the second numeric user input from the remote control after receiving the first numeric user input.

9. The method of claim 8, wherein determining that the second numeric user input corresponds to the second set of alphabetic letters and does not correspond to the second numeral associated with the second set of alphabetic letters in response to receiving the second numeric user input from the remote control after receiving the first numeric user input is not based on an amount of time that the second numeric user input is pressed.

10. The method of claim 8, wherein determining that the second numeric user input corresponds to the second set of alphabetic letters and does not correspond to the second numeral associated with the second set of alphabetic letters in response to receiving the second numeric user input from the remote control after receiving the first numeric user input is based independently from an amount of time that the second numeric user input is pressed.

11. A non-transitory computer-readable medium having encoded instructions to direct a media control system to perform a method comprising:
    processing a first single-numeral user input received from a remote control, wherein the processing identifies an amount of time that the first single-numeral user input is pressed;

further processing the first single-numeral user input to determine that the first single-numeral user input corresponds to a first numeral when the pressed time is less than a predetermined amount of time, and to determine that the first single-numeral user input corresponds to a first set of alphabetic letters when the pressed time is at least equal to the predetermined amount of time;

further processing the first single-numeral user input to identify the first set of alphabetic letters responsive to the first single-numeral user input being pressed for at least the predetermined amount of time;

selecting a first plurality of media channel names that each have a first alphabetic letter corresponding to the first set of alphabetic letters;

generating a first non-transitory signal to drive a first display of the first plurality of media channel names;

processing a second single-numeral user input subsequently received after the first single-numeral user input is received from the remote control, wherein the second single-numeral user input is identified as a second set of alphabetic letters in response to determining that the first single-numeral user input corresponds to the first set of alphabetic letters, and wherein the second single-numeral user input is not a second numeric input associated with the second set of alphabetic letters in response to determining that the first single-numeral user input corresponds to the first set of alphabetic letters;

selecting a second plurality of media channel names from the first plurality of media channel names, wherein each of the second plurality of media channel names have first alphabetic letter corresponding to the first set of alphabetic letters followed by a second alphabetic letter that corresponds to one of the alphabetic letters of the second set of alphabetic letters; and generating a second non-transitory signal to drive a second display of the second plurality of media channel names.

12. The non-transitory computer-readable medium of claim 11, wherein the second single-numeral user input is not identified as the second set of alphabetic letters based upon an amount of time that the second single-numeral user input is pressed.

13. The non-transitory computer-readable medium of claim 11, wherein the second single-numeral user input is identified as the second set of alphabetic letters independently from an amount of time that the second single-numeral user input is pressed.

14. A media control system comprising:
a control interface configured to receive and process a first numeric user input from a remote control that is received for a pressed amount of time, and to subsequently receive a second numeric user input after the first numeric user input is received; and
a processing system configured to process the first numeric user input and the second numeric user input, wherein the processing system is further configured to:
determine that the first numeric user input corresponds to a numeral when the amount of pressed time of the first numeric user input is less than a predetermined amount of time;
determine that the first numeric user input corresponds to a first set of alphabetic letters when the amount of pressed time of the first numeric user input is at least equal to the predetermined amount of time;

select a first plurality of media channel names based on the identified first set of alphabetic letters, wherein each of the first plurality of media channel names begins with a first alphabetic letter corresponding to one of the identified alphabetic letters of the identified first set of alphabetic letters;

in response to receiving the second numeric user input after receiving the first numeric user input, determine that the second numeric user input corresponds to a second set of alphabetic letters in response to determining that the first numeric user input corresponds to the first set of alphabetic letters, and determine that the second numeric user input is not a second numeric input associated with the second set of alphabetic letters in response to determining that the first numeric user input corresponds to the first set of alphabetic letters;

select a second plurality of media channel names from the first plurality of media channel names based on the identified second set of alphabetic letters, wherein each of the second plurality of media channel names has first alphabetic letter corresponding to the first set of alphabetic letters followed by a second alphabetic letter corresponding to one of the identified second set of alphabetic letters; and a display interface configured to transfer a first signal to drive a first display of the first plurality of media channel names and transfer a second signal to drive a second display of the second plurality of media channel names.

15. The media control system of claim 14 wherein the second plurality of media channel names comprises a video channel.

16. The media control system of claim 14 wherein:
the processing system is further configured to eliminate at least one of the first plurality of media channel names based on the second set of alphabetic letters that correspond to the second alphabetic letter of the first plurality of media channel names.

17. The media control system of claim 14 wherein the second display comprises video programming on one of the second plurality of media channel names.

18. The media control system of claim 14 wherein the second display comprises a video program guide for the second plurality of media channel names.

19. The media control system of claim 14 wherein the second display indicates that the second plurality of media channel names is a search input to a search interface.

20. The media control system of claim 14 wherein the second display indicates that one of the second plurality of media channel names is added to a favorite channels list.

21. The media control system of claim 14 wherein the control interface is configured to receive the first numeric user input and the second numeric user input from a television remote control device, and further comprising: a media interface configured to receive a media channel along with a plurality of other media channels.

22. The media control system of claim 14, wherein the second numeric user input is not determined to correspond to the second set of alphabetic letters based upon an amount of time that the second numeric user input is pressed.

23. The media control system of claim 14, wherein the second numeric user input is determined to correspond to the second set of alphabetic letters independently from an amount of time that the second numeric user input is pressed.

* * * * *